(12) United States Patent
Enevoldsen

(10) Patent No.: US 10,240,580 B2
(45) Date of Patent: Mar. 26, 2019

(54) ADJUSTING A ROTOR BLADE PITCH ANGLE

(71) Applicant: Siemens Aktiengesellschaft, Munich (DE)

(72) Inventor: Peder Bay Enevoldsen, Vejle (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 867 days.

(21) Appl. No.: 14/485,971

(22) Filed: Sep. 15, 2014

(65) Prior Publication Data

US 2015/0093242 A1    Apr. 2, 2015

(30) Foreign Application Priority Data

Oct. 1, 2013 (EP) .................................. 13186933

(51) Int. Cl.
*F03D 7/02* (2006.01)
*F03D 7/04* (2006.01)
*F03D 80/55* (2016.01)

(52) U.S. Cl.
CPC ............ *F03D 7/0224* (2013.01); *F03D 7/046* (2013.01); *F03D 80/55* (2016.05); *F03D 7/0256* (2013.01); *F05B 2260/80* (2013.01); *F05B 2270/328* (2013.01); *F05B 2270/335* (2013.01); *Y02E 10/723* (2013.01)

(58) Field of Classification Search
CPC ........ F03D 7/0224; F03D 80/55; F03D 7/046; F03D 7/0256
See application file for complete search history.

(56) References Cited

U.S. PATENT DOCUMENTS

| | | | |
|---|---|---|---|
| 2010/0021296 A1 | 1/2010 | Nielsen | |
| 2010/0101328 A1 | 4/2010 | Enevoldsen et al. | |
| 2010/0143129 A1 | 6/2010 | Fisher | |
| 2015/0322925 A1* | 11/2015 | Klitgaard | ................ F03D 17/00 416/1 |

FOREIGN PATENT DOCUMENTS

| | | |
|---|---|---|
| EP | 2075462 A2 | 7/2009 |
| EP | 2559894 A1 | 2/2013 |

\* cited by examiner

*Primary Examiner* — Moshe Wilensky
(74) *Attorney, Agent, or Firm* — Beusse Wolter Sanks & Maire

(57) ABSTRACT

A method of adjusting a pitch angle of a rotor blade of a rotor of a wind turbine is provided. The method comprises varying the pitch angle of the rotor blade during wind operation of the wind turbine from a starting angle to reach a limit angle ($\alpha 1$, $\alpha 2$) at which the rotor blade and/or an operational value (P) of the wind turbine reaches a predefined threshold limit (P1/2; $\alpha 1$, $\alpha 2$), deriving a safe angle ($\alpha 3$, $\alpha 4$) dependent on the limit angle ($\alpha 1$, $\alpha 2$), operating the rotor blade at the safe angle ($\alpha 3$, $\alpha 4$) or an angle from the safe angle ($\alpha 3$, $\alpha 4$) away from the limit angle ($\alpha 1$, $\alpha 2$). A pitch angle adjustment system is also provided for the same purpose.

15 Claims, 6 Drawing Sheets

ADJUSTING A ROTOR BLADE PITCH ANGLE

CROSS REFERENCE TO RELATED APPLICATIONS

This application claims priority to and the benefit of European Application No. EP13186933 filed Oct. 1, 2013, incorporated by reference herein in its entirety.

FIELD OF INVENTION

The present invention concerns a method of adjusting a pitch angle of a rotor blade of a rotor of a wind turbine. It also concerns a pitch angle adjustment system for that purpose.

BACKGROUND OF INVENTION

Wind turbines extract energy from wind with their rotor blades. While an airflow, i.e. the wind, passes over a rotor blade a lift force is created, which lift force is a result of a pressure difference between a suction side and a pressure side. From these lift forces there results a rotational movement of the rotor which comprises those rotor blades, which rotational movement is then used to generate power. That power output is then fed for instance into a utility grid. Depending on the wind speed the extractable energy changes. Modern up-to-date wind turbines operate relatively closely to the Betz limit (i.e. the theoretical maximum portion of rotational energy which can be extracted from a given wind at a given speed) under normal operating conditions. Generally, it is the aim to optimize wind turbine operation such that the most of extractable energy under given boundary conditions (such as wind speed, load, lifetime of the wind turbine and/or of parts thereof, noise, wear etc.) can be supplied.

State-of-the-art wind turbines feature a pitch system with which each rotor blade can be rotated around its longitudinal axis. With pitching the blade its pitch angle and as a consequence its so-called angle of attack can be changed and adjusted to achieve optimum operation for given conditions, for instance rotational speed of the rotor, tip speed of the rotor blades and wind speed.

The lift force and energy extracted from the wind increases with an increase of the angle of attack until a critical angle of attack is reached. Thereby, the angle of attack is the angle between the chord line of the rotor blade and the direction of the inflowing air arriving on the rotor blade.

A stall will occur if the angle of attack is further increased beyond the critical angle of attack, which is called the "stall angle" throughout this description.

When the rotor blade stalls, the airflow over the rotor blade separates from the rotor blade and a turbulent airflow dominates on the suction side of the rotor blade. The stall may cause an abrupt loss of lift on the rotor blade and thus an abrupt loss of extracted energy from the wind. In addition, unwanted loads are exerted on the wind turbine and unwanted, often considerably loud sounds are generated.

The occurrence of such stall (i.e. the stall angle) is also dependent on the condition of the blade, namely on its wearing condition and its soiling condition. For a typical wind turbine profile the surface condition can be influenced by dents, cracks and eyes (all of which are caused by ageing and thus wearing) and by accumulation of ice (icing) and/or of dust and dirt (i.e. by soiling).

The soiling and/or ice accumulation on a rotor blade can make the occurrence of a stall of the rotor blade more likely. That means a stall on a soiled and/or iced rotor blade can occur at an angle of attack $\alpha t$ which a clean rotor blade will still operate smoothly. The same applies analogously to worn rotor blades. Under fixed conditions a worn, iced or soiled rotor blade thus stalls at a lower angle of attack than a proper, i.e. unworn, iceless and clean, rotor blade. The problem with this is that the wearing, icing and soiling conditions of a rotor blade is not completely predictable or determinable and can vary. For instance, after a rain shower dirt might have been washed off the rotor blade and a stall would occur at a relatively high angle of attack. The determination of soil accumulation on the blade with sensors is however complex, expensive and not a matured enough technology. Consequently, wind turbines cannot be operated at their very optimum performance:

To avoid an unwanted stall the wind turbine is normally run conservatively within a high security margin of about 1° to 2° of the angle of attack to always compensate for a possibly soiled, iced or worn blade and the stall conditions due to those factors. This implies a power loss of about 1% to 2% due to the security margin. Operation of the wind turbine with such a pitch strategy normally avoids stalls and their unwanted effects. However, this pitch strategy also leaves potential for improved energy extraction as the wind turbine is not run at its full potential i.e. at its optimum angle of attack given the circumstances available for each rotor blade.

FIG. 1 shows a wind turbine 1 according to the state of the art: It comprises a number of rotor blades 3 of a rotor 9 which rotor 9 is connected to a nacelle 7. The nacelle 7 is positioned on top of a tower 5 which tower 5 is firmly connected to the ground 11. The ground 11 may be a monopile 11 installed offshore but also an onshore ground 11.

When the rotor 9 is rotated due to the incoming wind, its rotational movement is transferred into the nacelle 7 via a drivetrain (not shown). In the nacelle 7, there are positioned a gearbox and a generator (not shown) which latter generates electric power from the rotational movement. Alternatively, a generator can also be positioned in a transition zone of the wind turbine between the rotor and the nacelle; the generator then being realized as a direct drive generator, which implies that no gearbox is necessary.

FIG. 2 shows one rotor blade 3 of the wind turbine 1. It extends from a blade root 15 to a blade tip 13 and has a leading edge 17 and a trailing edge 19. The wind during wind turbine operation hits the rotor blade 3 at the leading edge 17 and flows along the profile of the rotor blade in the direction of the trailing edge 19.

FIG. 3 shows an airfoil of the rotor blade 3 at the cross-section of FIG. 2 along a section line III-III. The line 21 going through both the leading edge 17 and the trailing edge 19 is the so-called chord line 21, which represents the main (i.e. maximum) cross-sectional extension of the rotor blade 3. Wind hits the rotor blade 3 at a certain direction WD at an angle $\alpha$ to the chord line 21. This angle $\alpha$ is generally referred to as the angle of attack $\alpha$. The angle of attack $\alpha$ can be varied indirectly by varying the pitch angle of the rotor blade 3, i.e. by pitching the rotor blade 3 around its longitudinal axis, i.e. the axis that runs from the blade root 15 to the blade tip 13. Therefore, the angle of attack $\alpha$ is dependent (amongst other factors such as wind speed, and rotational speed of the rotor) on the pitch angle: by rotating the rotor blade 3 in the counter-clockwise direction in FIG. 3, the value of the angle of attack $\alpha$ is reduced, whereas by pitching the rotor blade 3 in the clockwise direction in FIG. 3, the value of the angle of attack α is increased.

The rotor blade 3 can be divided into a suction side Su and into a pressure side Pr, the suction side Su being on the one side of the chord line 21 and the pressure side Pr being on the other side of the chord line 21. Which side of the chord line 21 is the suction side Su und which side is the pressure side Pr depends on the angle of attack α. The side of the rotor blade 3 to which the angle of attack α is directed can be considered the pressure side Pr whereas the side of the rotor blade 3 from which the angle of attack α faces away can be considered the suction side Su. A lifting force F is generated due to the influence of the wind, i.e. due to suction forces on the suction side Su and to pressure forces on the pressure side Pr. Thereby, the lifting force F arises from a pressure gradient (or pressure difference between the suction side Su und the pressure side Pr according to Bernoulli's principle. The lifting force F forces the rotor blade 3 to force the rotor 9 to rotate around its rotational axis.

There is, however, a limit to that system, namely a critical angle of attack. This can be observed in FIG. 4: Over the angle of attack α the lift coefficient C1 is depicted in the diagramme. Two lines $L_1$, $L_2$ refer to a behaviour of a soiled rotor blade ($L_1$) and of a clean rotor blade ($L_2$) both being rotor blades of the same age and thus wearing conditions and both not being covered by ice. Thus, the two rotor blades essentially only differ with respect to their soiling conditions. It can be observed that the lower curve $L_1$ of the soiled rotor blade reaches its maximum value of lift coefficient $C1_1$ at a lower angle of attack $α_{Max1}$ than the upper lift curve $L_2$ of the clean rotor blade. Rather the clean rotor blade's maximum value of lift coefficient $C1_2$ is higher than $C1_1$ and is reached at a higher angle of attack $α_{Max2}$. In both curves $L_1$, $L_2$, it can be observed that shortly after having reached the angles of attack $α_{Max1}$/$α_{Max2}$ the lift coefficient C1 drops down quite rapidly. That means that the stall angle is reached very early after the angles of attack $α_{Max1}$/$α_{Max2}$ at which the maximum lift coefficient $C1_1$, $C1_2$ can be measured. In other words—the soiled rotor blade stalls at a lower angle of attack than the clean one.

Certainly, a very soiled rotor blade, a very worn rotor blade or a very iced rotor blade or indeed a combination of a soiled and iced, a soiled and worn and/or an iced and worn rotor blade can even lead to a situation in which the security gap indicated above may not be enough. Therefore, it is highly desirable to have a possibility of finding out more precisely the state of a rotor blade of a wind turbine with respect to the three mentioned factors, i.e. soiling, icing and wearing.

SUMMARY OF INVENTION

It is then an object of the present invention to provide a possibility of adjustment of the pitch angle of a rotor blade in a refined manner. In particular, this adjustment is preferably more reliable with respect to a danger or risk of when a stall angle will be reached.

This object is met by the method and by the pitch angle adjustment system according to the claims.

According to aspects of the invention, the above-mentioned method comprises the following steps: a) varying the pitch angle of the rotor blade during wind operation of the wind turbine from a starting angle to reach a limit angle at which the rotor blade and/or an operational value of the wind turbine reaches a predefined threshold limit, b) deriving a safe angle dependent on the limit angle, c) operating the rotor blade at the safe angle or an angle from the safe angle away from the limit angle.

The method thus makes use of a deliberate determination of a limit angle at a given time of measurement, this measurement comprising step a). Thereby, the "limit angle" is such pitch angle (or angle which is dependent on the pitch angle) which represents a certain predefined threshold limit of the rotor blade and/or of the above-mentioned operational value of the wind turbine. Examples of possible limit angles will be given below.

The method according to aspects of the invention thus makes possible a very exact and up-to-time measurement of the limits of the wind turbine operation in general, in particular of the stalling limits of the rotor blade(s). That measurement is taken during operation of the rotor of the wind turbine. Thus, such limit angle value represents directly or indirectly the state of the rotor blade(s) at that given moment in time. A more precise adjustment of the pitch angle, possibly with a much smaller safety margin (by a more exact adjustment of the safe angle), can be the result which then leads (given a relatively "normal" blade) to an increase of power production (of an estimated 0.4% to 0.8%) and/or (given a very soiled/iced/worn blade) to an even greater reduction of pitch angle for safety purposes. Furthermore, knowing that the turbine is operated safely below stall, can impact the optimum blade and profile design giving additional improved efficiency of the turbine.

Accordingly and in analogy with the method according to aspects of the invention, the pitch angle adjustment system of the above-mentioned kind comprises according to aspects of the invention: a) a pitch variator which in operation varies a pitch angle of the rotor blade during wind operation of the wind turbine from a starting angle to reach a limit angle at which the rotor blade and/or an operational value of the wind turbine reaches a predefined threshold limit, b) a measurement sensor realized to acquire a limit measurement signal when the limit angle has been reached, c) an analyzation and derivement unit realized to derive a safe angle dependent on the limit angle.

The pitch variator thus carries out step a) of the method according to aspects of the invention and later step c) of the same method. During step a) the measurement sensor acquires the limit measurement signal which represents the limit angle. The analyzation and derivement unit carries out step b) of the method according to aspects of the invention.

Any of the components of the pitch angle adjustment system, in particular the pitch variator, and the analyzation and derivement unit, may each and possibly all of them be realized as software components on a processor, but also as hardware components or as a combination thereof.

Therefore, aspects of the invention also concern a computer programme product directly loadable into a processor of a programmable pitch angle adjustment system comprising programme code to conduct all steps of the method according to aspects of the invention when the computer programme product is executed on the pitch angle adjustment system.

Further, aspects of the invention also concern a wind turbine with a rotor comprising a number of rotor blades. This wind turbine is equipped with a pitch angle adjustment system according to the invention. Thereby, the wind turbine can be equipped with the pitch angle adjustment system right from the start, i.e. when assembled, but it can also be re-equipped with it even later, i.e. after a previous start of operation.

Particularly advantageous embodiments and features of the invention are given by the dependent claims, as revealed in the following description. Features of different claim categories may be combined as appropriate to give further embodiments not described herein.

According to an embodiment of the invention, the operational value of the wind turbine comprises a power output of the wind turbine under a predefined operational condition of the wind turbine. The limit angle in that case can be that pitch angle at which the highest power output of the wind turbine has been reached. Once that occurs, it definitely does not make any sense to pitch the rotor blade further. This way it can be guaranteed that the pitch angles of the rotor blade(s) are adjusted optimally.

As for the predefined operational condition, this may include a predefined number of operational parameters such as wind speed and/or rotational speed of the rotor so that it is guaranteed that the operational condition is a condition for wind turbine operation which delivers representative and reproducable measurement results.

This embodiment may imply that an overall operational (maximum) value of the wind turbine is derived which thus generalizes the behaviour of all rotor blades of the wind turbine. However, it can also be realized such that the pitch angle of only one rotor blade is varied at a time so that a very exact operational value relating to that very rotor blade can be acquired. One advantage of this embodiment lies in the fact that the power output is measured anyway so that no additional measurements need to be made.

According to another preferred embodiment, which can be used alternatively to the first-described embodiment or additionally, the limit angle comprises a stall angle at which the rotor blade starts to stall.

Thereby, the "stall angle" can be defined as that critical angle of attack at which a first indication of a stall can be observed, i.e. measured. Such indication can for instance be considered if the lift force decreases only slightly and not abruptly (as would be the case during a stall) or if the stall only indicates itself rather than already occurs. In general, any decrease of lift after reaching a maximum lift value can be indicative of a stall and the angle of attack αt which that decrease of lift is measured can be defined as the stall angle.

With this embodiment, the behaviour of the rotor blade (individually or together with other rotor blades of the rotor) in the wind with respect to stalls is measured directly and thus very exactly. Thus, such stall angle value represents the state of the rotor blade at that given moment in time. A more precise adjustment of the angle, possibly with a much smaller safety margin (by a more exact adjustment of the safe angle), can be the result which then leads (given a relatively "normal" blade) to an increase of power production (of an estimated 0.4% to 0.8%) and/or (given a very soiled/iced/worn blade) to an even greater reduction of pitch angle for safety purposes.

When comparing the two above-described embodiment, it becomes clear that the one involving the stall angle as a limit angle is predominantly safety-orientated (i.e. it aims at avoiding a stall by setting the safe angle lower than the determined stall angle) whereas the second embodiment is mainly output orientated. These two embodiments can also be combined, whereby it is highly preferred in such case that the stall angle is considered to be the limit angle if the angle with the highest power output is above the stall angle. This also applies for other limit angles than a limit angle dependent on the power output—in order to put safety first, if the stall angle is known this stall angle is preferably used to determine the maximum possible limit angle in the context of the method according to aspects of the invention. This measure follows safety principles and also the principle to avoid any unnecessary disturbance to the environment of the wind turbine.

Preferably, step a) is performed under a predefined maximum speed limit of a rotation speed of the rotor—such speed limit may for instance define the predefined operational condition mentioned above). This means that for example the method step a) may take place only when the wind turbine operates under relatively low wind conditions at which the rotor does not reach its peak speed but rather a lower speed below a threshold rotational speed value, which speed value is defined as the predefined maximum speed (limit). Alternatively or additionally, the rotational speed can be intentionally reduced by means of a suitable braking mechanism. This measure helps to keep the noise generated by a stall at the stall angle at a desired minimum and/or helps to keep loads on the rotor blade(s), the rotor and the wind turbine's other mechanical and electrical components (such as the drivetrain, a gearbox, the generator, the nacelle and the tower) as low as desired in order to avoid additional wearing of any of these components. In other words, the rotational speed limit serves as a safety and noise-preventing measure. Such speed limit measures are also necessary because exactly measurable stalls might not occur at very high rotational speeds. Further, noise reduction of wind turbines is a very important issue in order to comply with legal regulations of their operation and in particular in order not to disturb inhabitants of houses where wind turbines are relatively close to residential areas.

As outlined above, the limit angle, in particular the stall angle, is influenced by temporary factors, in particular soiling and icing. Therefore, a limit angle value acquired at a certain point of time may not be valid for all too long and may need to be adapted to new soiling and icing conditions—and on the long run also to new wearing conditions of the rotor blades. It is therefore highly preferred that step a) is repeated at given time intervals, preferably at least twice a day. Preferably steps b) and c) follow each repetition of step a). This repeated verification of the limit angle serves to adapt the safety angle in case it is considered necessary due to a changed limit angle. Again, this measure is both a safety measure and a measure by which a better power output can be achieved.

The repetition can be carried out at regular intervals such as at a given time of a day, week and/or month. In addition or alternatively, it can be advantageous if step a) is repeated after an appearance of a specific operational condition of the wind turbine. In particular such specific operational condition may comprise critical occasions during the operation of the wind turbine (and the rotor blade), i.e. occasions after which it may be expected that the rotor blade's condition (soiling, icing, wearing) becomes worse, i.e. that the limit angle might be a reduced one in comparison with the last determination. But also (additionally or alternatively) such operational conditions may comprise occasions after which it may be expected that the rotor blade's condition (again with respect to soiling, icing, wearing etc.) becomes better, i.e. that the limit angle might be an increased one in comparison with the last determination.

For instance, the specific operational condition can comprise a standstill of the rotor or a predefined number of standstills and/or an appearance of a specific weather condition, in particular precipitation.

As for the occasion of a standstill, it may be expected that when the rotor of the wind turbine starts to rotate again, the above-mentioned conditions of the rotor blade might have changed. In addition, after a standstill the rotor first rotates comparatively slowly such that its rotational speed does not exceed a certain limit such as the speed limit mentioned above.

As for precipitation, this may lead (depending on the temperature and wind) to icing of the rotor blades or—on the other hand—to a cleaning effect when rain washes down dust and dirt from the rotor blade so that soiling is reduced substantially. In both cases, a re-determination of the limit angle of the rotor blade may be necessary in order to be able to re-adjust the safe angle.

The method according to aspects of the invention can be used solely for the purpose of determination of a suitable safe angle. However, it also has another positive effect which can be used, namely an indirect determination of the state or status of the rotor blade. It is thereby preferred that a status parameter value representing a status of the rotor blade is derived from the limit angle. The determined limit angle can thus be used as a representation of the current status of the rotor blade. In order to derive a status parameter value representing one particular status parameter, it may be advantageous to take into account a number of additional factors in the form of other parameter values such as an age of the rotor blade, a long-term behaviour value of the limit angle, weather conditions or the like. For instance, under weather conditions which may lead to ice on the rotor blade, a status parameter value concerning soiling and/or wearing of the rotor blade may not be accurate as the rotor blade might simply be covered with ice.

According to two different variants which can be applied solely or combinedly, the status parameter value is derived such that it (first variant) comprises a material condition parameter value representing a material condition state of the rotor blade and/or (second variant) such that it comprises a soiling parameter value representing a soiling state of the rotor blade. The material condition parameter value is preferably determined in the long run, i.e. over a time period of at least a month, preferably at least three months, most preferred at least a year. This way, short-time effects such as those due to soiling and/or icing can be levelled out. Therefore, the material condition parameter value is preferably derived from a long-term behaviour value of the limit angle. In contrast, the soiling parameter value may already be derived in a comparison between two successive cycles of the method according to aspects of the invention, but certainly also over a longer period.

Upon the status parameter value being beyond a certain predefined threshold value, an alarm signal is preferably generated. If the threshold value refers to a status parameter value which is desiredly as high as possible (such as a status parameter value referring to cleanness of the rotor blade and/or to low wear of the rotor blade), the alarm is preferably only generated if the status parameter goes below that threshold value. In contrast, if the threshold value refers to a status parameter value which is desiredly as low as possible (such as a status parameter value referring to soling of the rotor blade and/or to wear of the rotor blade), the alarm is preferably only generated if the status parameter goes above that threshold value.

Such alarm signal can indicate the necessity of an exchange and/or a repair of the rotor blade, possibly at the next inspection. The alarm signal can also be used to trigger a cleaning process, preferably an automatic cleaning process, of the rotor blade. This alarm signal then preferably refers to a soiling parameter value going beyond a predefined threshold value.

As for the safe angle which is determined in step b) of the method according to the aspects of invention, that is preferably derived from the limit angle by subtracting from the latter a safety margin angle. Such safety margin angle serves to cover all those circumstances due to which the limit angle is reduced before a new determination of the limit angle by means of the method according to aspects of the invention. However, as the method according to aspects of the invention is a more exact determination of the limit angle than a mere preassumption, the safety margin angle can still be smaller than the safety margin according to the state of the art. It is thereby preferred that the safety margin angle is at least 0.5°. On the other hand, it is preferably not higher than 2°, most preferred not higher than 1°. This helps to increase the overall power output and still leaves enough margin for a safe operation of the wind turbine.

In this context it may also be mentioned that the safety margin angle may also by determined by taking into account one, several or indeed all of the following determinating factors represented by representative parameter values of these factors: the air density, the wind shear and veer, the air humidity, the air pressure, and air turbulences, i.e. environmental factors which have an effect on the behaviour of the rotor blades.

The safety margin angle may also be adjusted in dependence of an age value and/or a status parameter value of the rotor blade. That means that depending on the age (and thus a preassumed higher wear) of the rotor blade and or directly depending on the status of the rotor blade which status is represented by the status parameter value, the safety margin angle may be varied. As a preferred rule, the older the blade and/or the worse its condition (with respect to the above-mentioned status parameter values—i.e. the lower the limit angle) the higher is the safety margin angle selected. Such adjustment of the safety margin angle in dependence of the status parameter value may also be carried out in a self-learning system circle in which the system automatically learns after steps a) to c) have been repetitively carried out, which safety margin angle is necessary at which status parameter value to represent a safe enough overall control of the pitch of the rotor blade.

Most wind turbines comprise rotors with a plurality of rotor blades, for example the rotor blade depicted in FIG. 1. In this context it need be mentioned that there are several strategies of how to deal with individual rotor blades in a rotor with several rotor blades when determining the limit angle (in particular when the limit angle comprises a stall angle).

A first approach is to adjust the pitch angle of each rotor blade individually according to the method according to aspects of the invention. That also means that the limit angle for each rotor blade is determined individually.

A second approach is to determine individually the limit angles of each of the rotor blades and then to derive one safe angle for all rotor blades of the rotor, whereby the lowest limit angle of all rotor blades determines the safe angles of them all.

A third approach is to take one rotor blade as representative for all rotor blades of the rotor and to adjust the pitch angles of all rotor blades in dependence of the safety angle of the representative rotor blade.

Generally, it is preferred that the limit angle is determined over a period of time during which the rotor blade goes through at least one full rotation cycle, i.e. during which the rotor has rotated along at least 360°. This helps to account for operational influences such as wind shear and a change of the angle of attack during the rotation cycle.

Which approach is chosen depends on experience and on a cost benefit assumption: the first approach is the most accurate one, however implies that different rotor blades may be pitched at different angles to the wind which may have adverse effects, also concerning power output of the wind turbine. The second approach is less accurate but leads to an overall pitch angle which may be very effective. The last approach in which preferably the oldest or the most worn of all rotor blades is used as the reference, may be less effective concerning power output but also implies the least effort.

Other objects and features of the present invention will become apparent from the following detailed descriptions considered in conjunction with the accompanying drawings. It is to be understood, however, that the drawings are designed solely for the purposes of illustration and not as a definition of the limits of the invention. They are not necessarily drawn to scale.

DETAILED DESCRIPTION OF INVENTION

FIGS. 1 to 4 have already been explained above with reference to the prior art.

Figure 1:
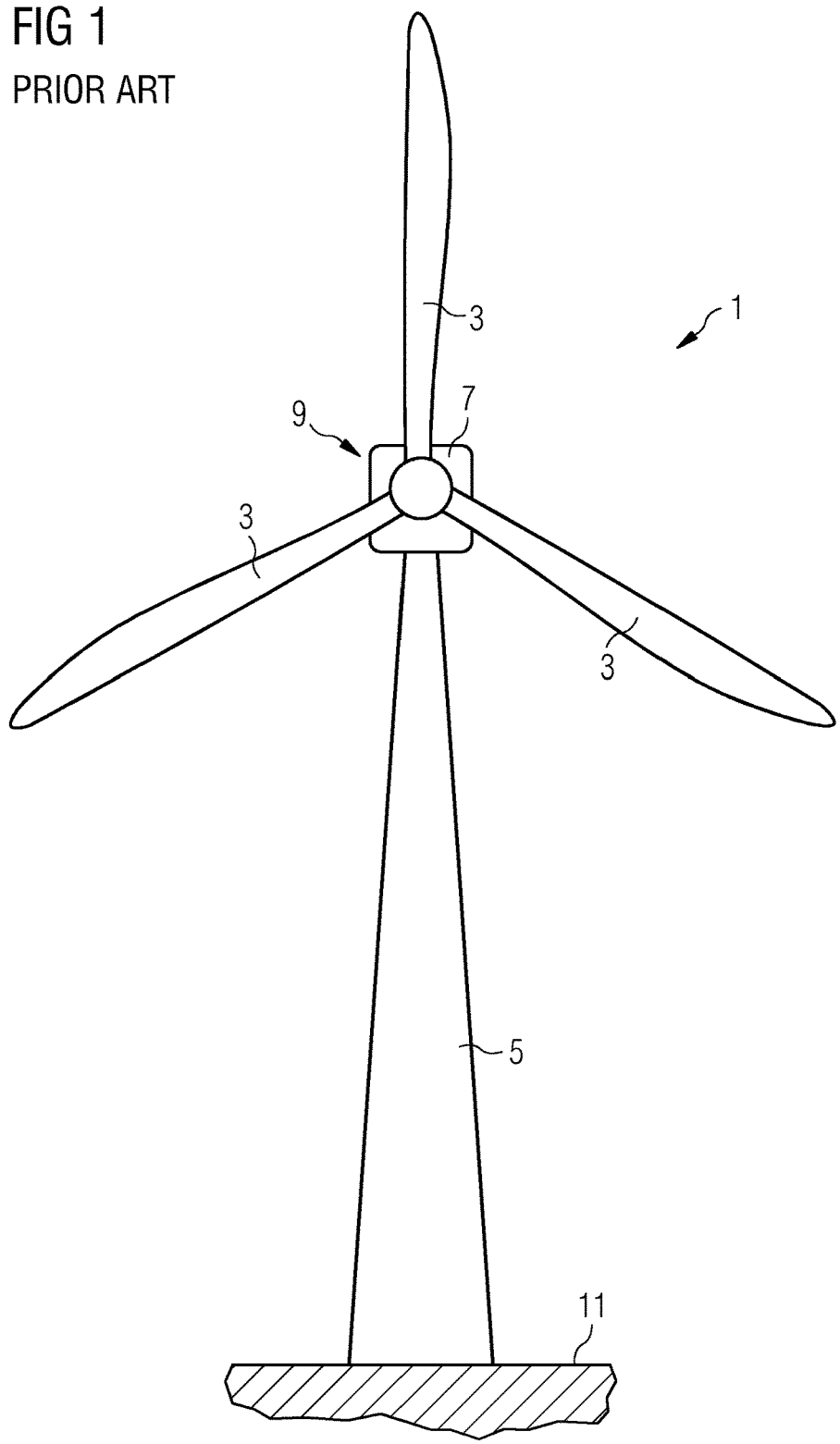
FIG. 1 shows a front view of a wind turbine according to the prior art.
Figure 2:
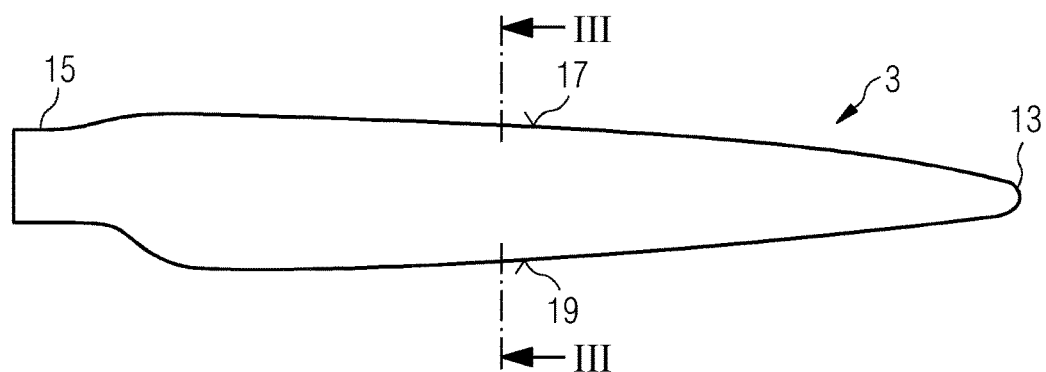
FIG. 2 shows a front view of one of the rotor blades of the wind turbine of FIG. 1.
Figure 3:
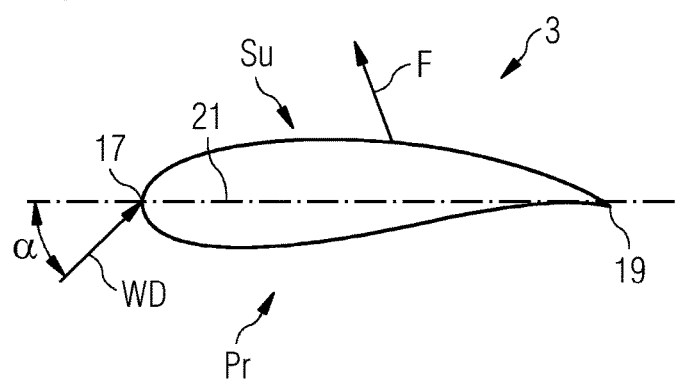
FIG. 3 shows a cross-sectional view of the rotor blade of FIG. 2.
Figure 4:
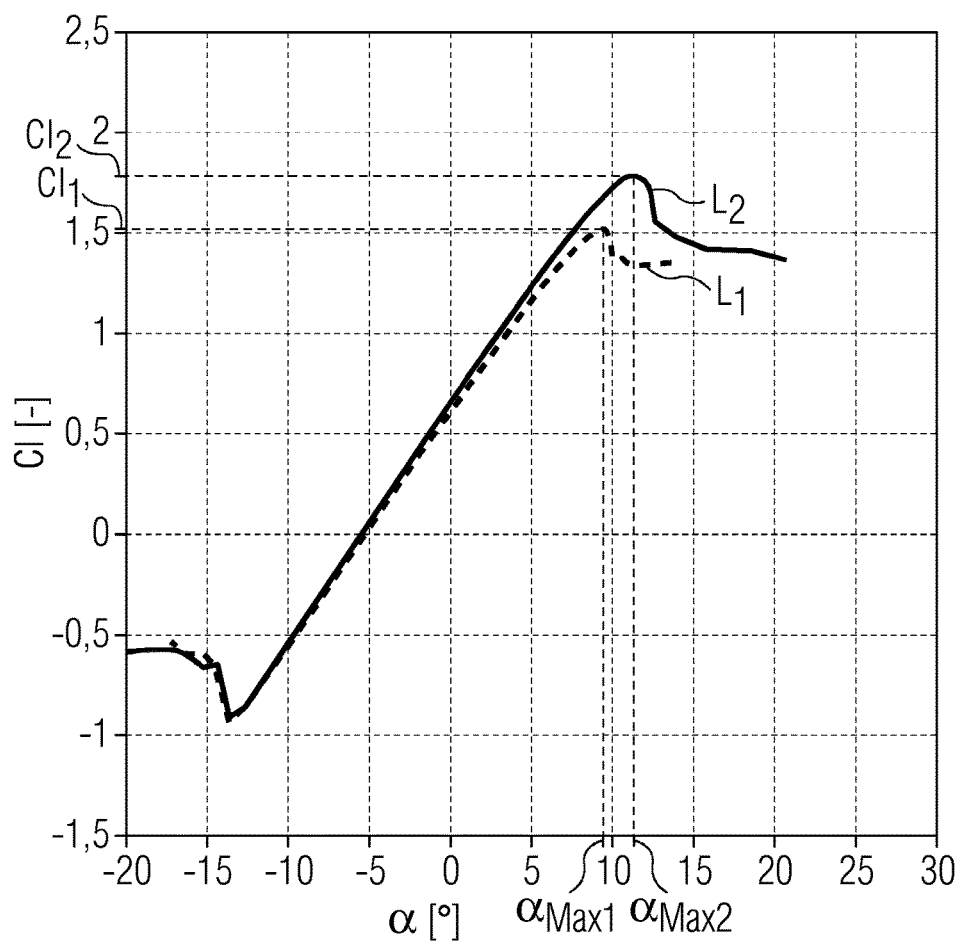
FIG. 4 shows a diagramme showing the lift coefficient behaviour of two wind turbine blades according to the prior art.
Figure 5:
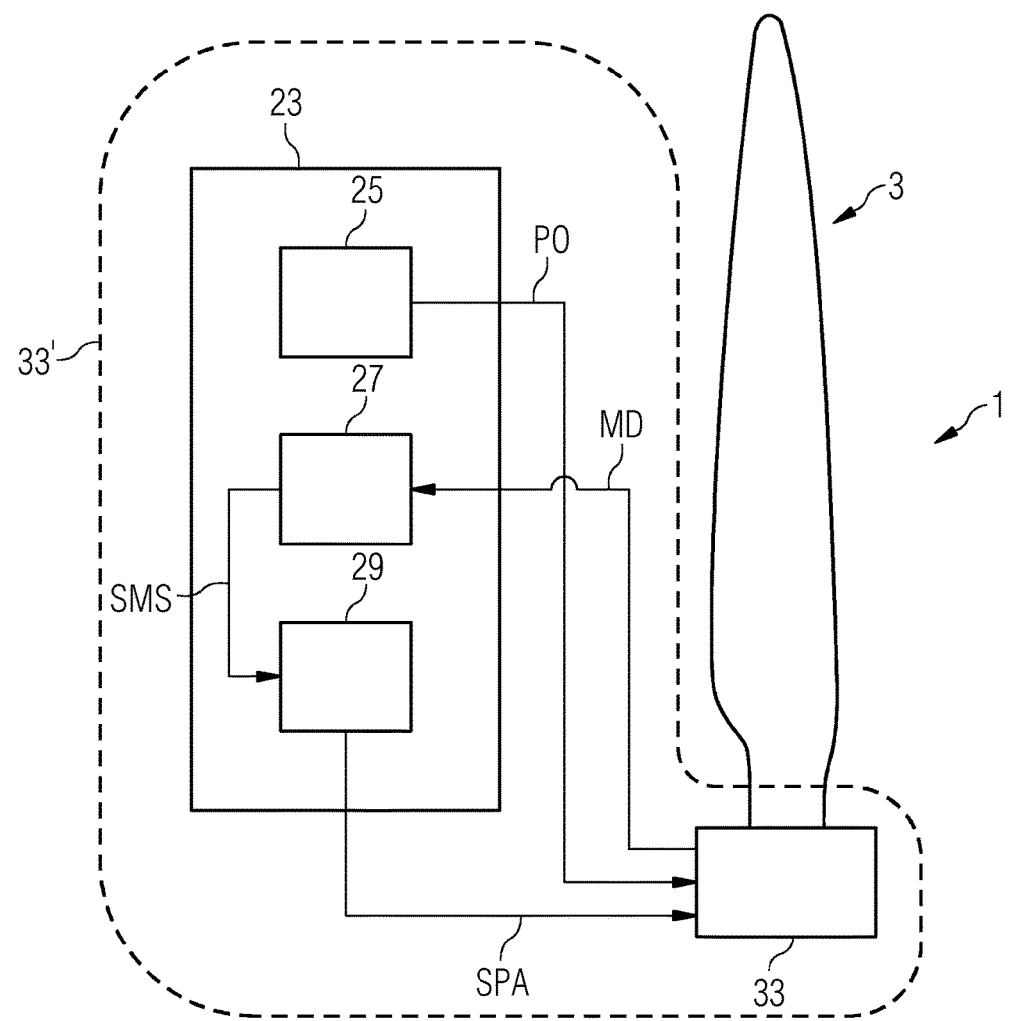
FIG. 5 shows in a schematic block diagramme two embodiments of pitch angle adjustment systems according to aspects of the invention.

FIG. 5 shows a block diagramme of two embodiments of pitch angle adjustment systems 33, 33' according to aspects of the invention:

A rotor blade 3 of a wind turbine 1 such as the ones depicted in FIGS. 1 to 3 is equipped with such pitch angle adjustment systems 33, 33'. The first pitch angle adjustment system 33 comprises a central unit 23, a pitch variator 25, a measurement sensor 27 and an analyzation and derivement unit 29. The pitch variator 25, the measurement sensor 27 and the analyzation and derivement unit 29 are all connected to a pitch adjustment actuator 31 via one common or via several interfaces (not shown). The second pitch angle adjustment system 33' comprises all the components of the first pitch angle adjustment system 33 plus the pitch adjustment actuator 31.

The pitch adjustment actuator 31 adjusts the pitch angle. It is driven by the pitch variator 25 which gives pitch orders PO to it. Thereby, the pitch variator 25 varies the pitch angle of the rotor blade during wind operation of the wind turbine 1 from a starting angle to reach a limit angle, in this case a stall angle at which the rotor blade starts to stall.

In return, the pitch adjustment actuator 31 generates measurement data MD which are handed over to the measurement sensor 27. These measurement data MD represent the lift force, represented by the lift coefficient C1 of the rotor blade 3 as described with reference to FIGS. 3 and 4. From those measurement data MD the measurement sensor 27 generates a limit measurement signal SMS—here a stall measurement signal SMS—once the limit angle has been reached. From this stall measurement signal SMS, i.e. from the information that the stall angle has been reached at a certain pitch angle, the analyzation and derivement unit 29 generates a safe angle SPA which it hands over to the pitch adjustment actuator 31.

The pitch adjustment actuator 31 is ordered not to exceed the safe angle SPA during normal operation. Thus, it operates the rotor blade at the safe angle SPA or at an angle from the safe angle SPA away from the limit angle, i.e. an angle lower than the safe angle SPA.

Figure 6:
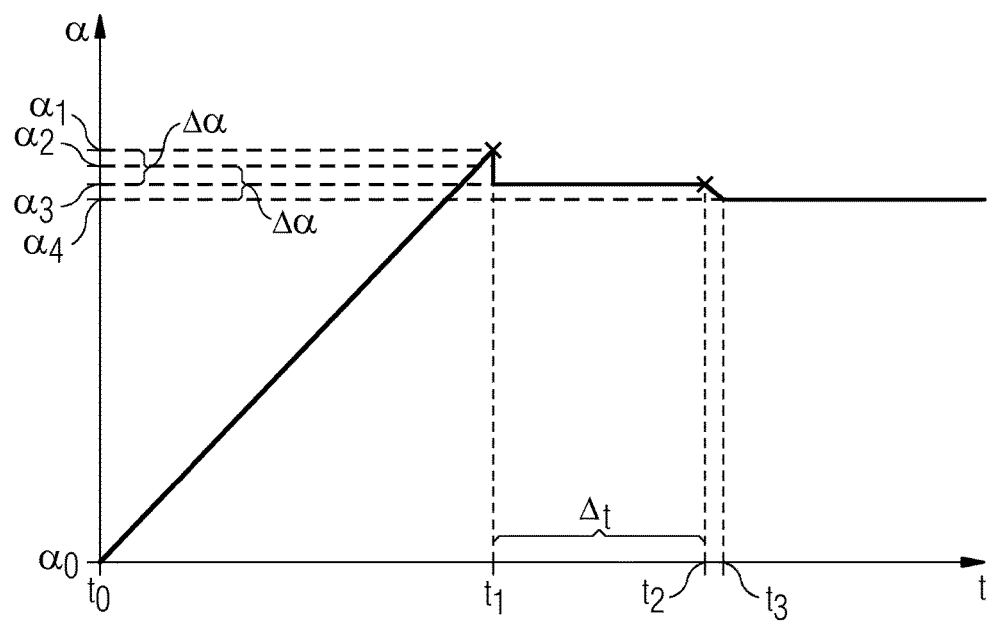
FIG. 6 shows a diagramme of an adjustment of the angle of attack of a rotor blade using a method according to aspects of the invention.

FIG. 6 shows in a diagramme the adjustment behaviour of the pitch angle adjustment systems 33, 33' in more detail. Over the time t there is depicted the angle of attack $\alpha$ of the rotor blade 3 which is (amongst others) dependent on the pitch angle of the rotor blade 3.

Initially, at a first point of time $t_0$ the rotor blade 3 is pitched such that the rotor blade 3 has a starting angle of attack $\alpha_0$. It is then pitched towards a (first) stall angle $\alpha_1$ at which the rotor blade 3 starts to stall. This occurs at a second point of time $t_1$. The pitch angle adjustment systems 33, 33' then reduces the angle of attack $\alpha$ by a safety margin angle $\Delta_\alpha$ to a (first) safe angle $\alpha_3$ which is the stall angle $\alpha_1$ minus the safety margin angle $\Delta_\alpha$. The rotor blade 3 is pitched at this safe angle $\alpha_3$ or below until step a) of the method according to aspects of the invention is repeated at a third point of time $t_2$ after a preferably predefined time span $\Delta_t$, which is for instance half a day. Then, the angle of attack $\alpha$ is again at the point of time $t_2$ increased to a (second) stall angle $\alpha_2$, which is in this case lower than the previous (first) stall angle $\alpha_1$. This new (second) stall angle $\alpha_2$ is reached at a fourth point of time $t_3$. This reduction in amount of the stall angles $\alpha_1$, $\alpha_2$ is for instance due to soiling of the rotor blade 3. Accordingly, from the fourth point of time $t_3$, the angle of attack $\alpha$ is again reduced by the safety margin angle $\Delta_\alpha$ to a (second) safe angle $\alpha_4$ which is the new (second) stall angle $\alpha_2$ minus the same safety margin angle $\Delta_\alpha$. The rotor blade 3 is then pitched at this second safe angle $\alpha_4$ or below until step a) of the method according to aspects of the invention is repeated yet again.

Such procedure is carried out under a specific condition, in particular under a specific wind speed. It may be repeated at different wind speeds in order to receive a series of safe angles at different wind speeds. Alternatively and/or additionally the soiling or wear status parameter value of the rotor blade 3 can be determined from the stall angles $\alpha_1$, $\alpha_2$ (cf. below with reference to FIG. 8), from which also a series of safe angles for different wind speeds can be calculated.

Figure 7:
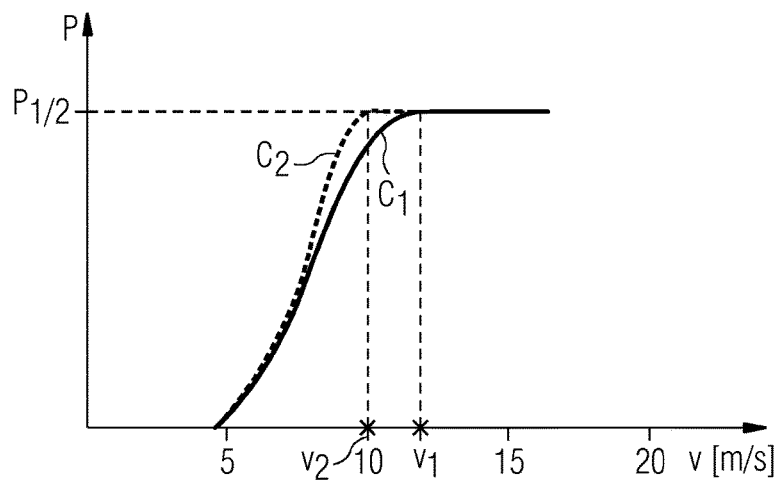
FIG. 7 shows two power output curves, one of a wind turbine according to the state of the art and one of a wind turbine according to an embodiment of the invention.

FIG. 7 shows two power curves $C_1$, $C_2$ of a wind turbine 1, the first power curve $C_1$ representing the electric power output P (unscaled) over the wind speed v in m/s when the wind turbine 1 is operated according to the state of the art. The second power curve $C_2$ represents the electric power output P (unscaled) over the wind speed v in m/s when the pitch angles of the rotor blades 3 of the wind turbine 1 have been adjusted according to an embodiment of the method according to aspects of the invention. It can be observed that due to the method according to aspects of the invention the rotor blades 3 are pitched such that the corresponding second power curve $C_2$ rises steeper and thus reaches faster a maximum power output $P_{1/2}$: In comparison with the first power curve $C_1$, the maximum power output $P_{1/2}$ is reached at a wind speed v which is 2 m/s lower, namely at a wind speed $v_2$ of about 10 m/s in comparison with a wind speed $v_1$ of about 12 m/s when regarding the first power curve $C_1$. FIG. 7 may also be used as a reference for another embodiment of the method according to aspects of the invention. As described above, as the limit angle $\alpha_1$, $\alpha_2$ of the rotor blade 3 a stall angle $\alpha_1$, $\alpha_2$ can be used. However, it is also possible to use the angle at which the wind turbine 1 shows the maximum power output $P_{1/2}$ as the limit angle.

Figure 8:
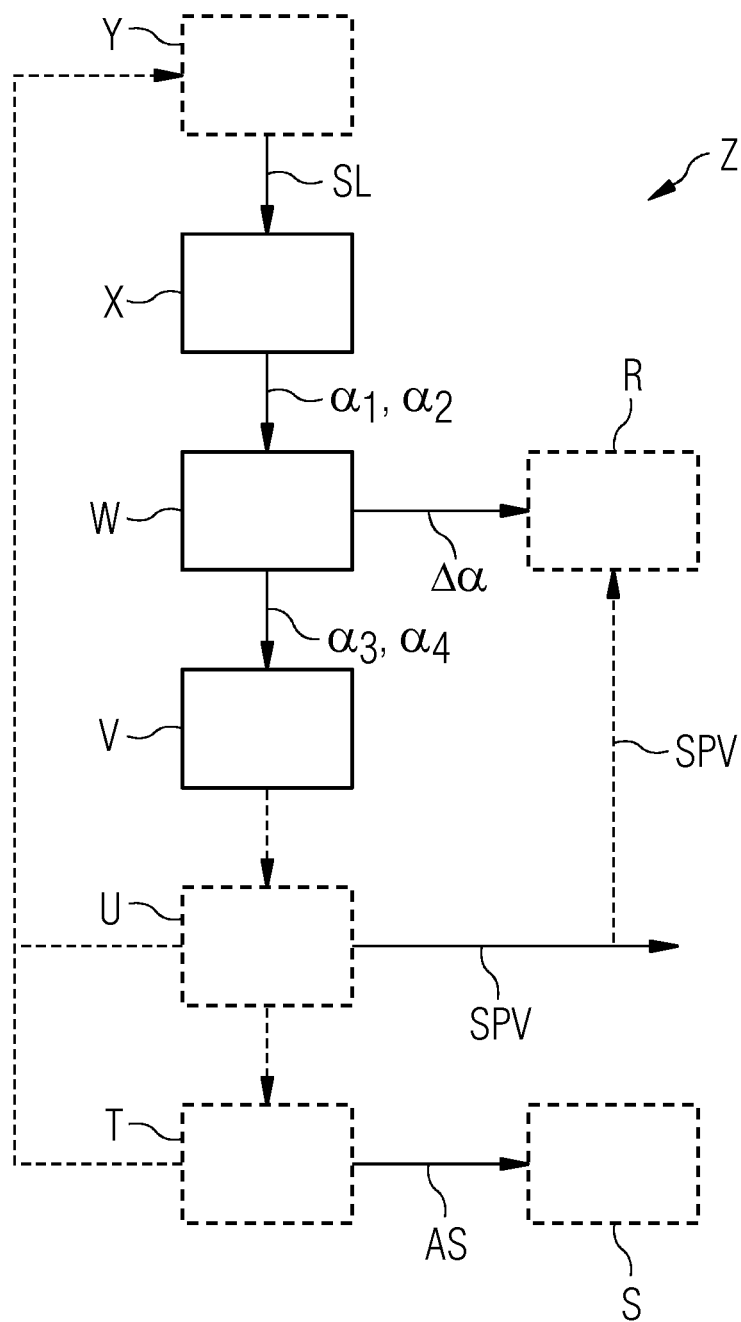
FIG. 8 shows a schematic block diagramme of steps of an embodiment of the method according to aspects of the invention.

FIG. 8 shows a block diagramme of an embodiment of the method Z according to aspects of the invention, for which reference is made to FIG. 6, in particular to the process up to the first reduction of the pitch angle $\alpha$.

In a first, optional step Y, the rotational speed of the rotor 9 of the wind turbine 1 is reduced to or below a speed limit SL. Then, in a second step X, the pitch angle, i.e. the angle of attack $\alpha$ is varied during wind operation of the wind turbine 1 from the starting angle $\alpha_0$ to reach the stall angle $\alpha_1$ at which the rotor blade 3 starts to stall. In a third step W the safe angle $\alpha_2$ is derived from the stall angle $\alpha_1$, namely by subtracting the safety margin angle $\Delta_\alpha$ from the stall angle $\alpha_1$. This safety margin angle $\Delta_\alpha$ may be predefined in an optional additional step R. In a fourth step V the rotor blade 3 is operated at the safe angle $\alpha_3$ or an angle below that safe angle $\alpha_3$. Further, in an optional additional step U a status parameter value SPV is derived from the stall angle $\alpha_1$. The status parameter value SPV represents a status of the rotor blade 3, for instance its soiling state and/or its icing state and/or its wear. A further optional step T includes the generation of an alarm signal AS if the status parameter value SPV is beyond a certain predefined threshold. This alarm signal may in a further optional step S lead to an automatic cleaning process of the rotor blade 3, for instance if the status parameter value SPV represents a soiling state and/or an icing state which can be improved by cleaning.

The dotted lines from step V and step U indicate that the method according to aspects of the invention is preferably carried out repetitively, as explained with reference to FIG. 6. In a second round, the same procedure as outlined above is done once again, therefrom resulting the second stall angle $\alpha_2$ and the second safe angle $\alpha_4$. It can also be observed that the status parameter values can be used for the definition of the safety margin angle $\Delta_\alpha$ in step R after the first repetition of the method Z.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of adjusting a pitch angle ($\alpha$) of a rotor blade of a rotor of a wind turbine, comprising:
   a) varying the pitch angle of the rotor blade during power-generating operation of the wind turbine from a starting angle to reach a limit angle applicable to current boundary conditions, the limit angle comprising a stall angle ($\alpha 1$, $\alpha 2$), wherein the varying of the pitch angle is effective to ensure the rotor blade starts to stall,
   b) deriving a safe angle ($\alpha 3$, $\alpha 4$) dependent on the stall angle ($\alpha 1$, $\alpha 2$),
   c) operating the rotor blade at the safe angle ($\alpha 3$, $\alpha 4$) or an angle lower than the safe angle ($\alpha 3$, $\alpha 4$) during power-generating operation and for a period of time,
   d) repeating steps a, b, and c together to ensure the respective limit angle reflects respective current boundary conditions at different points in time during power-generating operation, and
   reducing a rotational speed of the rotor to below a speed limit before varying the pitch angle.

2. The method according to claim 1, wherein
   the stall angle ($\alpha 1$, $\alpha 2$) comprises an angle at which a decrease of lift is measured after reaching a maximum lift value.

3. The method according to claim 1, wherein the repeating of steps a, b, and c occurs at given time intervals.

4. The method according to claim 1, wherein the repeating of steps a, b, and c occurs after an appearance of a specific operational condition of the wind turbine.

5. The method according to claim 4, wherein
   the specific operational condition comprises a standstill and/or an appearance of a specific weather condition.

6. The method according to claim 1, wherein
   a status parameter value (SPV) representing a status of the rotor blade is derived from the stall angle ($\alpha 1$, $\alpha 2$).

7. The method according to claim 6, wherein
   the status parameter value (SPV) is derived such that it comprises a material condition parameter value representing an amount of wear of the rotor blade and/or such that it comprises a soiling parameter value representing a soiling state of the rotor blade.

8. The method according to claim 7, wherein
   upon the status parameter value (SPV) being beyond a certain predefined threshold value, an alarm signal (AS) is generated.

9. The method according to claim 1, wherein
   in step b) the safe angle ($\alpha 3$, $\alpha 4$) is derived from the stall angle ($\alpha 1$, $\alpha 2$) by subtracting from the stall angle ($\alpha 1$, $\alpha 2$) a safety margin angle ($\Delta\alpha$).

10. The method according to claim 9, wherein
    the safety margin angle ($\Delta\alpha$) is adjusted in dependence of an age value and/or a status parameter value (SPV) of the rotor blade.

11. The method according to claim 3 wherein
    step a) is repeated at given time intervals comprising at least twice a day.

12. The method according to claim 5 wherein
    the specific operational condition comprises the appearance of the specific weather condition, and the specific weather condition comprises precipitation.

13. The method according to claim 8 wherein
    the alarm signal (AS) is used to trigger a cleaning process (S) of the rotor blade.

14. The method according to claim 8 wherein
    the alarm signal (AS) is used to trigger an automatic cleaning process of the rotor blade.

15. A method of adjusting a pitch angle ($\alpha$) of a rotor blade of a rotor of a wind turbine, comprising:
    a) operating the rotor blade at a predetermined maximum permissible angle during power-generating operation of the wind turbine,
    b) varying the pitch angle of the rotor blade during wind operation of the wind turbine from the predetermined maximum permissible angle in order to reach a limit angle at which a power output reaches a maximum power output or a limit angle at which the rotor blade starts to stall,
c) deriving a safe angle ($\alpha 3$, $\alpha 4$) dependent on the limit angle ($\alpha 1$, $\alpha 2$),
d) operating the rotor blade at the safe angle ($\alpha 3$, $\alpha 4$) or an angle lower than the safe angle ($\alpha 3$, $\alpha 4$), and
reducing a rotational speed of the rotor to below a speed limit before varying the pitch angle.

* * * * *